(12) United States Patent
Hoerl et al.

(10) Patent No.: US 8,044,822 B2
(45) Date of Patent: Oct. 25, 2011

(54) ROTATIONAL TRANSMITTER

(75) Inventors: Roland Hoerl, Boennigheim (DE); Heiko Graf, Gerlingen (DE)

(73) Assignee: Komet Group GmbH, Besigheim (DE)

( * ) Notice: Subject to any disclaimer, the term of this patent is extended or adjusted under 35 U.S.C. 154(b) by 1085 days.

(21) Appl. No.: 11/885,681

(22) PCT Filed: Feb. 22, 2006

(86) PCT No.: PCT/EP2006/001586
§ 371 (c)(1),
(2), (4) Date: Sep. 4, 2007

(87) PCT Pub. No.: WO2006/094630
PCT Pub. Date: Sep. 14, 2006

(65) Prior Publication Data
US 2008/0180279 A1    Jul. 31, 2008

(30) Foreign Application Priority Data
Mar. 9, 2005   (DE) .......................... 10 2005 011 197

(51) Int. Cl.
*G08C 19/06* (2006.01)
(52) U.S. Cl. ................. 340/870.31; 340/870.32; 336/75; 336/79; 336/84 R; 336/122
(58) Field of Classification Search ......... 340/870.31–870.32; 336/75, 79, 336/84 R, 122
See application file for complete search history.

(56) References Cited

U.S. PATENT DOCUMENTS

| | | | |
|---|---|---|---|
| 2,904,012 A * | 9/1959 | Hazen | 91/11 |
| 3,239,734 A * | 3/1966 | Levy | 318/690 |
| 3,758,845 A | 9/1973 | MacKelvie et al. | |
| 4,326,128 A * | 4/1982 | Klein | 250/231.14 |
| 4,837,556 A | 6/1989 | Matsushita et al. | |
| 4,851,835 A * | 7/1989 | Krumholz et al. | 340/870.37 |
| 5,791,836 A | 8/1998 | Feufel | |
| 7,053,791 B2 | 5/2006 | Kazmierczak | |
| 7,660,497 B2 * | 2/2010 | Happel et al. | 385/25 |
| 2003/0179105 A1 | 9/2003 | Kazmierczak | |
| 2011/0103912 A1 * | 5/2011 | Fronius et al. | 409/131 |

FOREIGN PATENT DOCUMENTS

DE   3724349 A1   2/1989

(Continued)

OTHER PUBLICATIONS

International Search Report dated Mar. 9, 2005 (6 pages).

*Primary Examiner* — Albert Wong
(74) *Attorney, Agent, or Firm* — Flynn, Thiel, Boutell & Tanis, P.C.

(57) ABSTRACT

The invention relates to a rotary transmitter for example for use in machine tools with adjusting tools. The rotary transmitter comprises a stator part (18) and a rotor part (26), each having a respective stator core part (72) and a rotor core part (74), which are separated from one another at mutually facing ends via an air gap, and each having at least one respective power winding (76, 78), which is wound on the stator core part and the rotor core part, in order to transmit power using the transformer principle, and having respective stator and rotor coupling turns (80', 80", 82', 82"), which are associated with one another in pairs, for inductive data transmission. One aim of the invention is to transmit data without interference. A further aim is a low maintenance requirement. In order to achieve this, the invention primarily proposes that the coupling turns (80', 80", 82', 82") are separated from the area of the power winding (76, 78), and are shielded from them, by parts of the respective core parts (72, 74), and are arranged in the associated stator part and rotor part (18, 26) in each case forming a three-dimensioned curved loop.

26 Claims, 13 Drawing Sheets

FOREIGN PATENT DOCUMENTS

| | | |
|---|---|---|
| DE | 195 38 528 A1 | 4/1997 |
| DE | 196 49 682 A1 | 6/1998 |
| DE | 100 12 981 A1 | 9/2001 |
| DE | 100 46 659 A1 | 4/2002 |
| DE | 101 03 280 A1 | 8/2002 |
| DE | 102 00 488 A1 | 7/2003 |
| EP | 0 719 199 B1 | 7/1996 |
| EP | 0 926 690 A1 | 6/1999 |

* cited by examiner

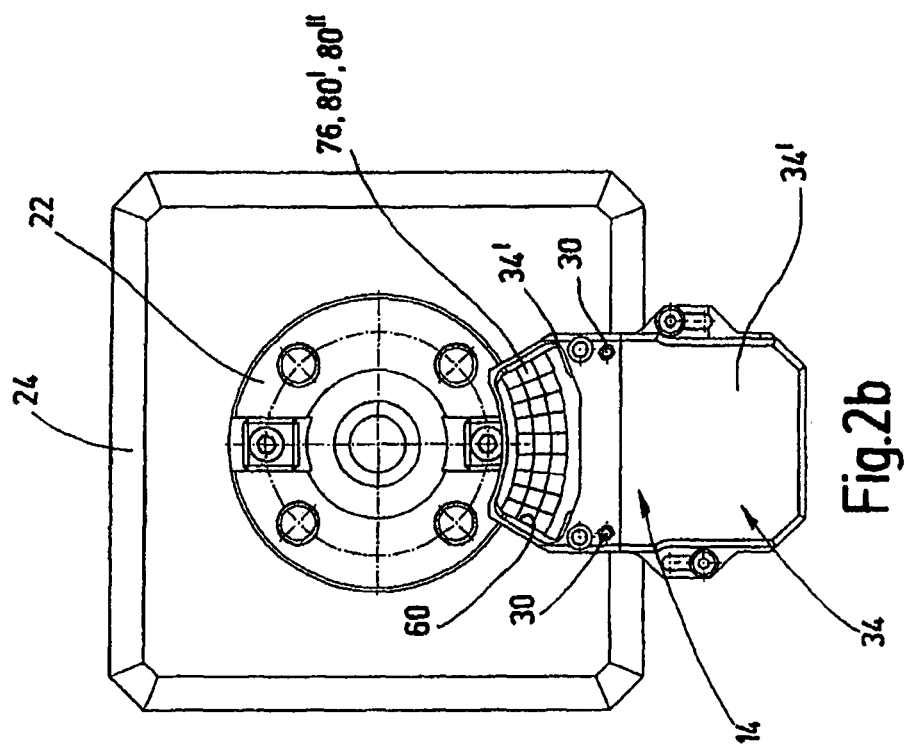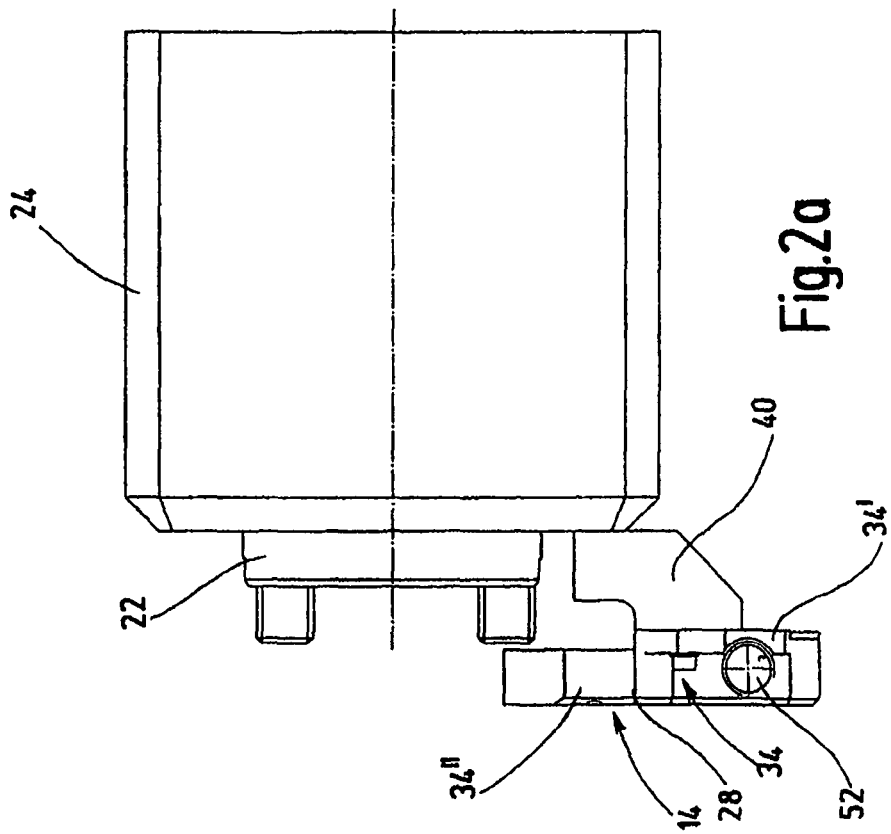

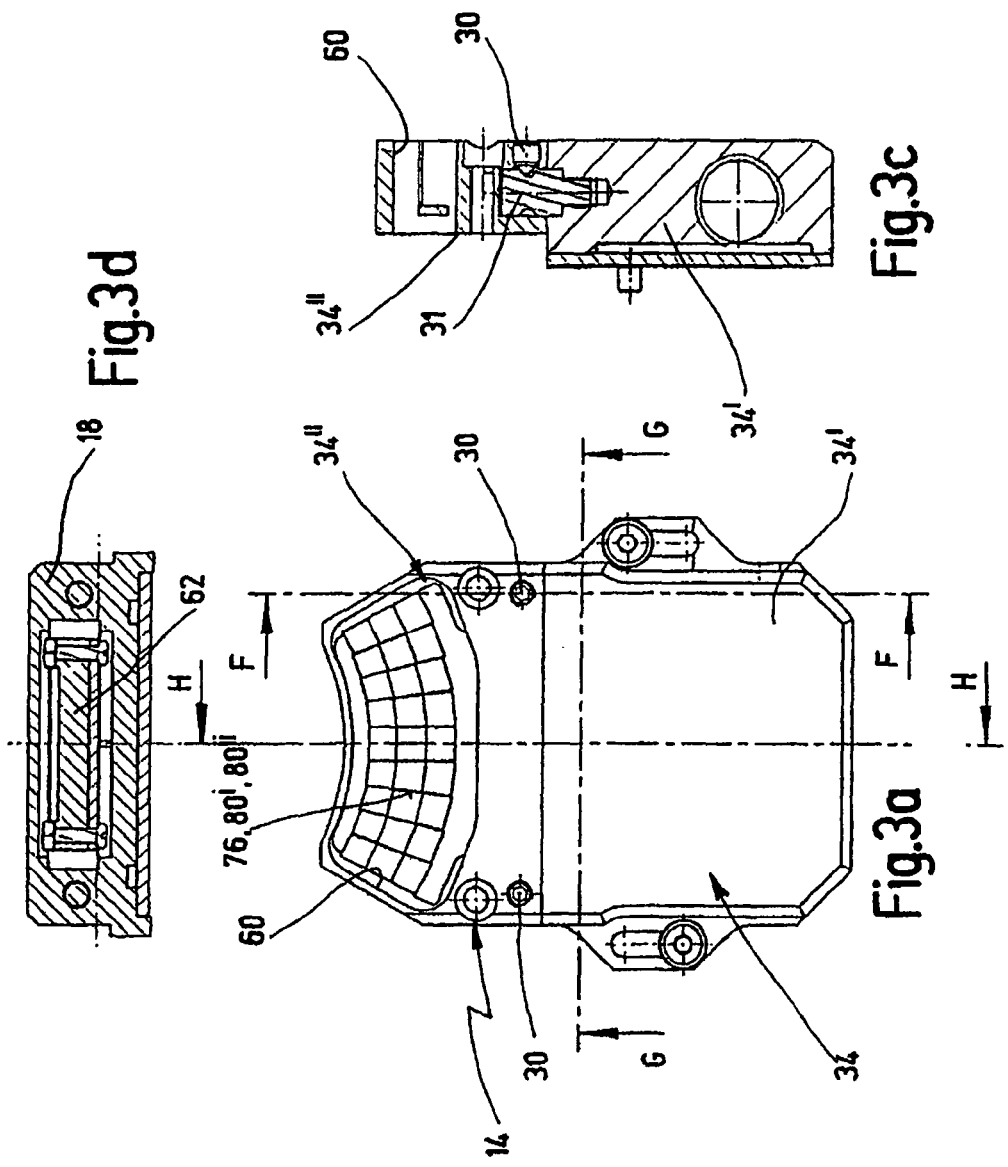

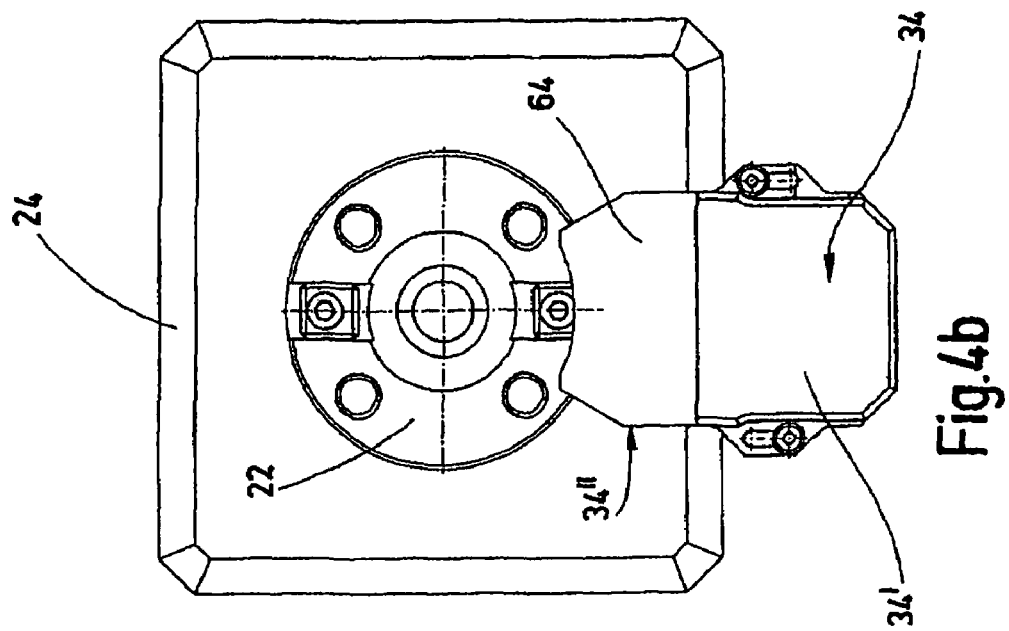
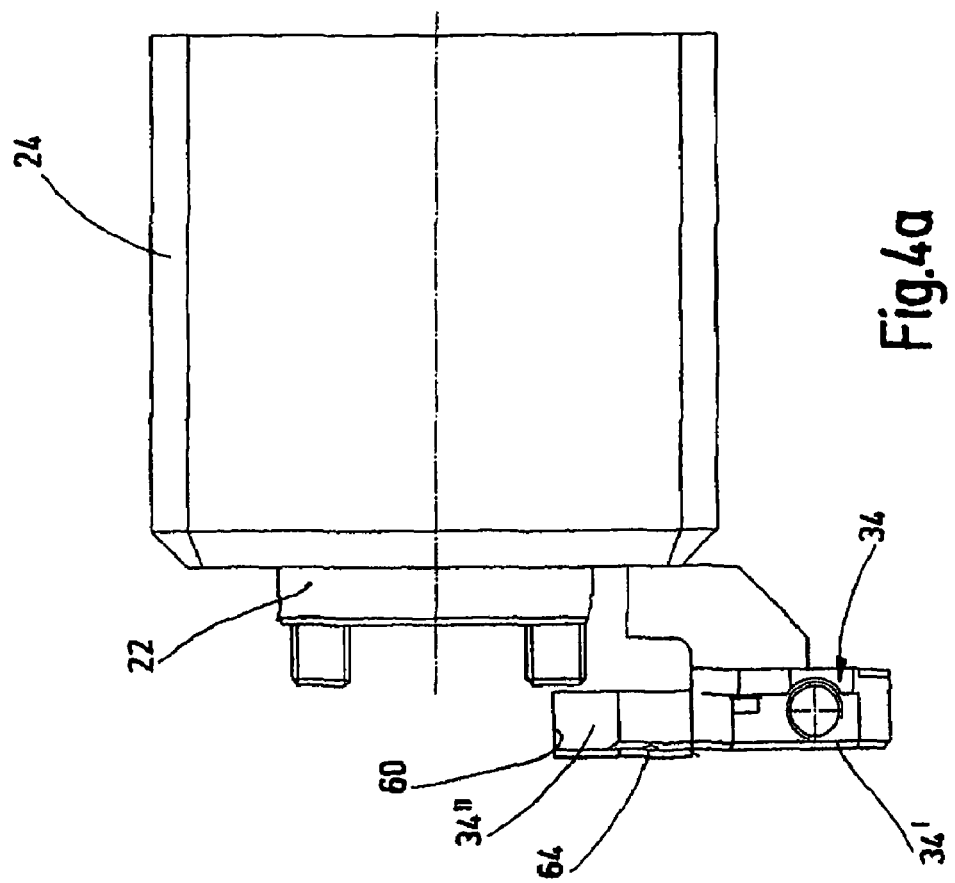

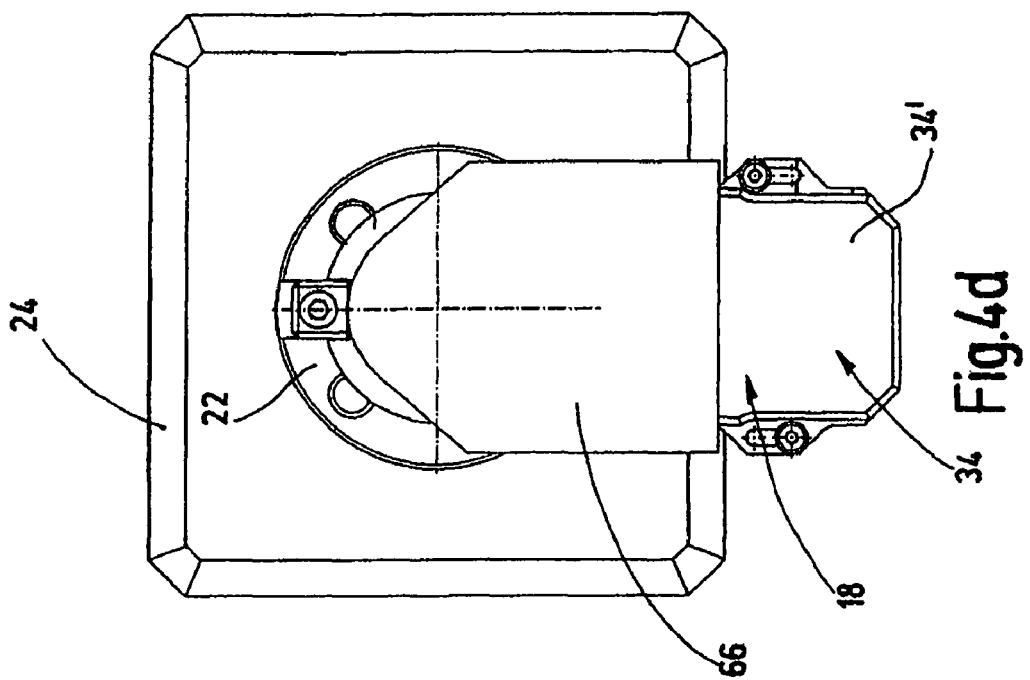
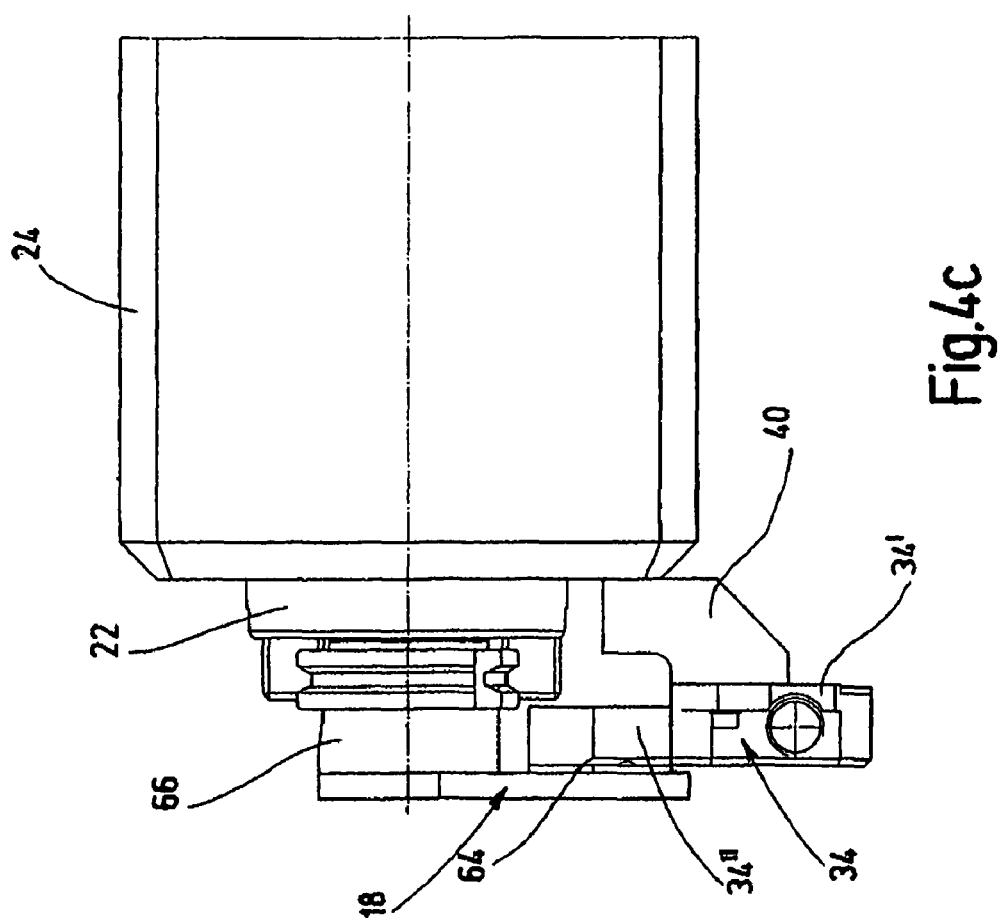

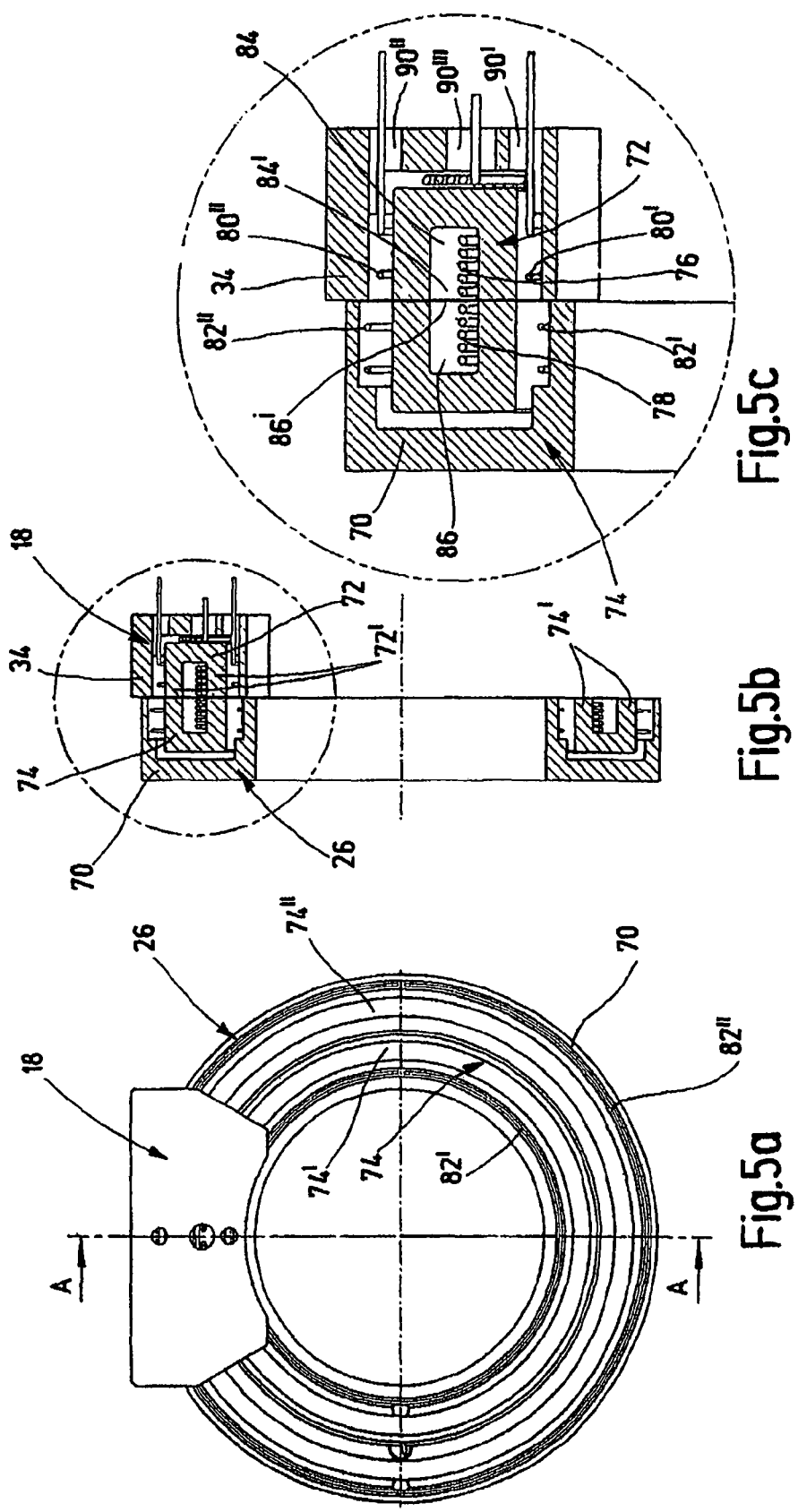

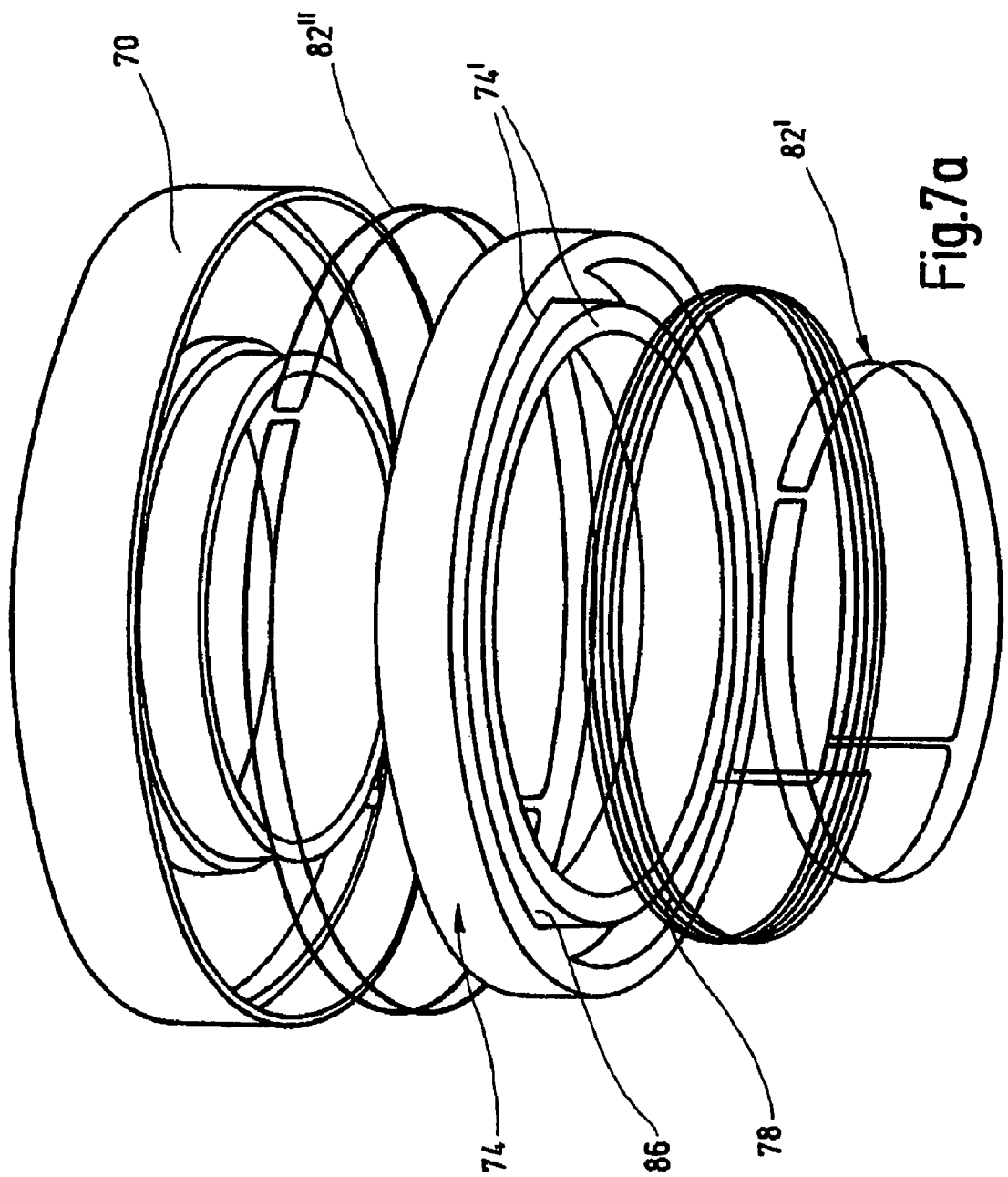

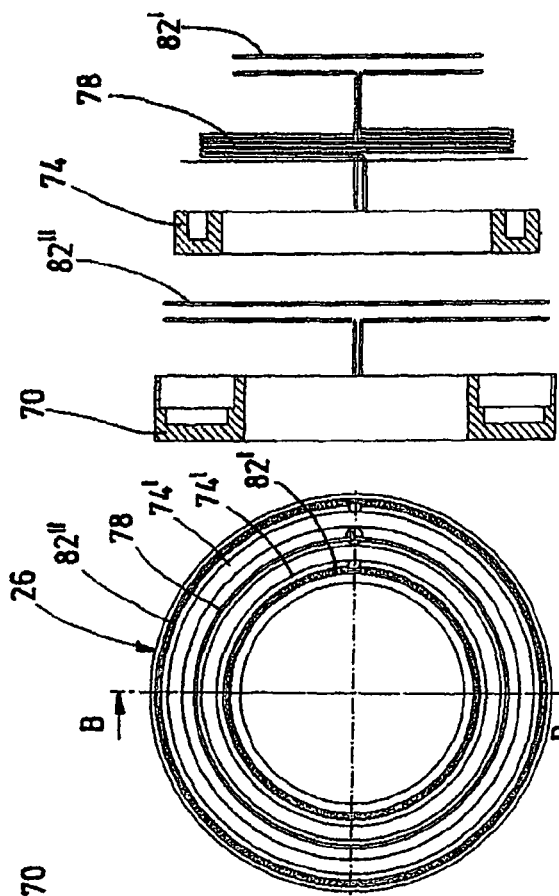
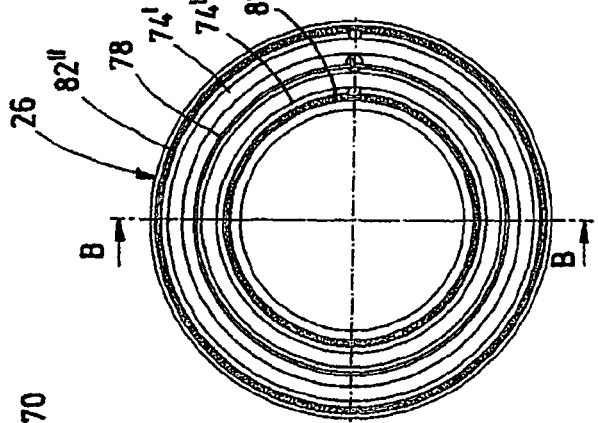
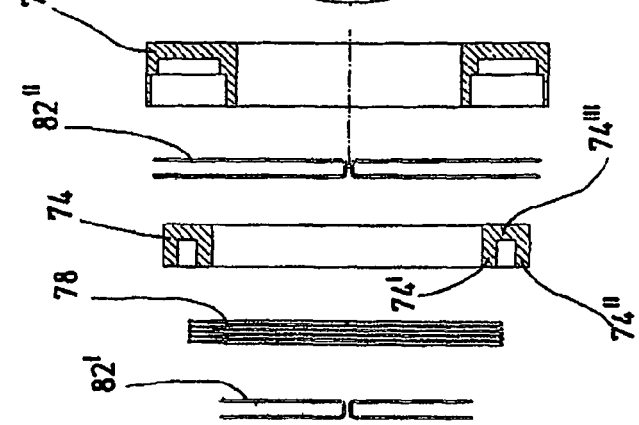
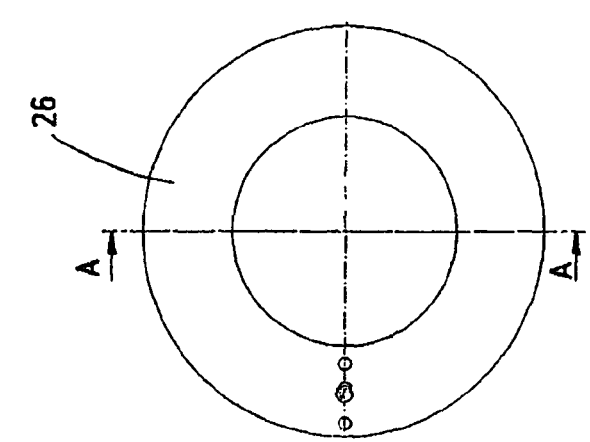

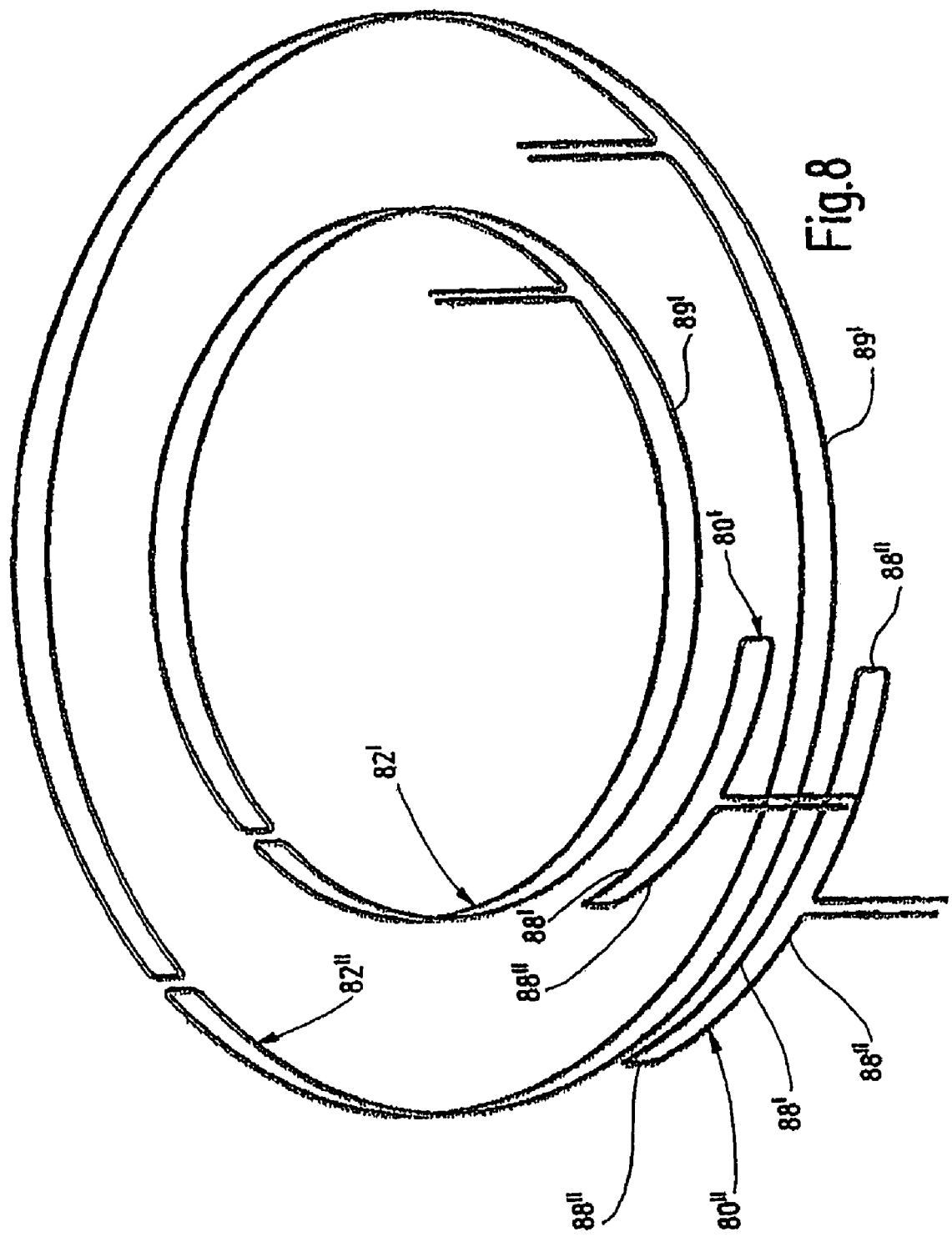

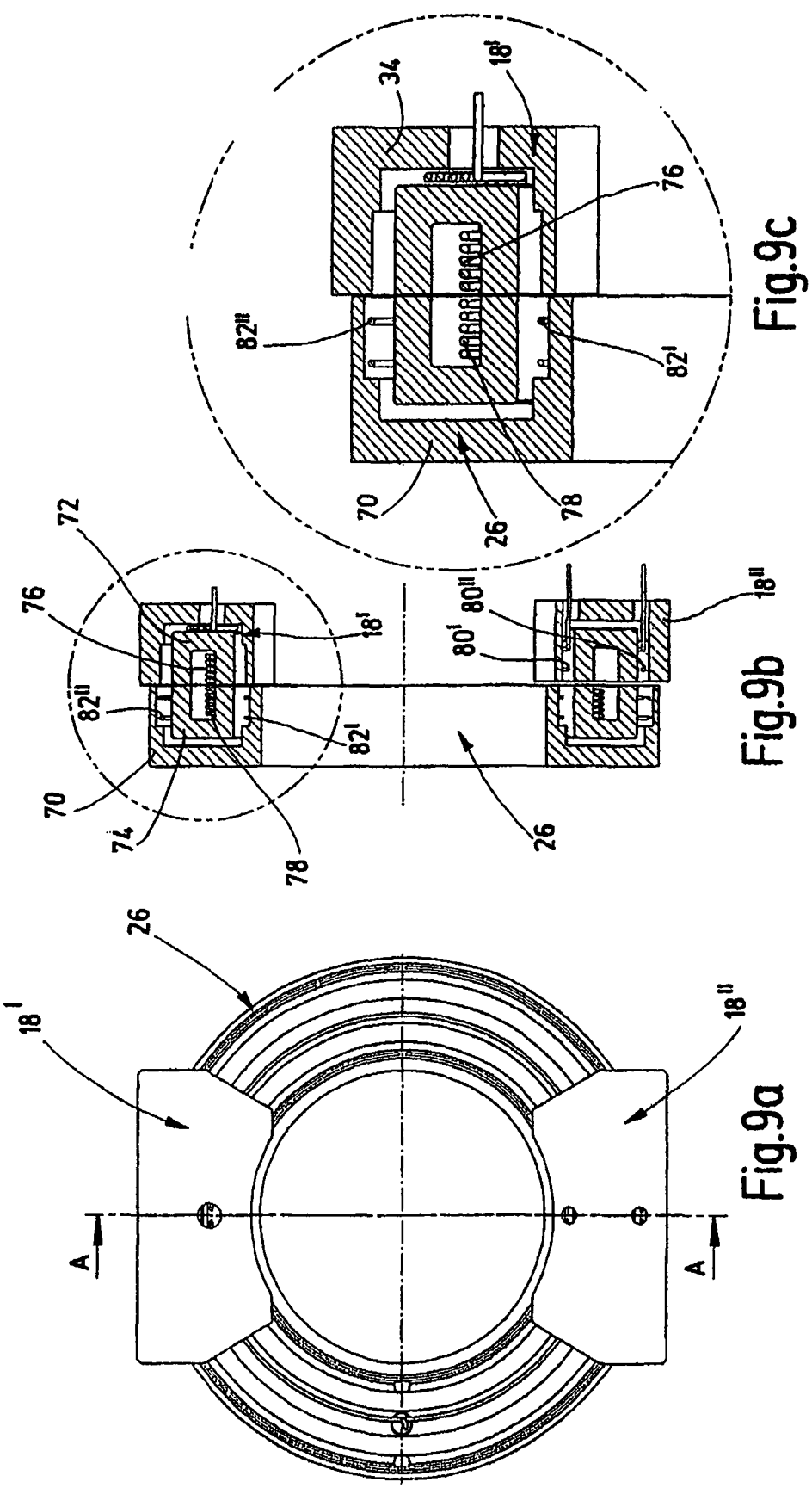

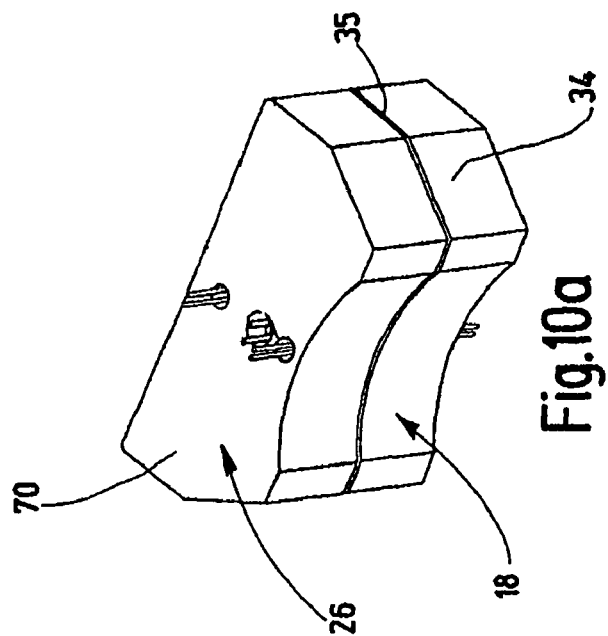
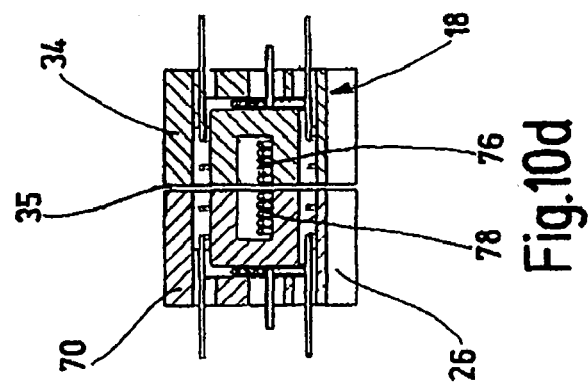
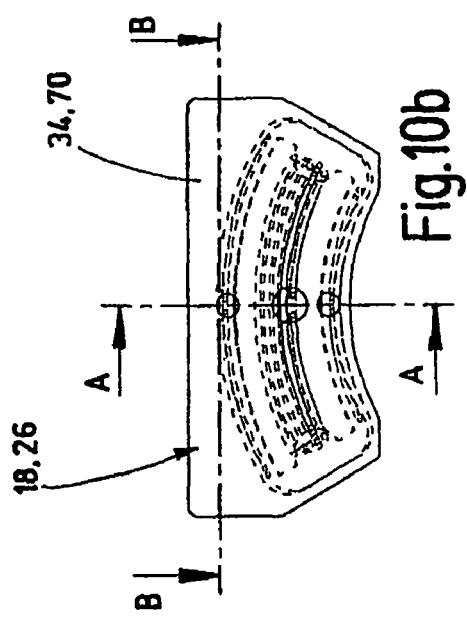
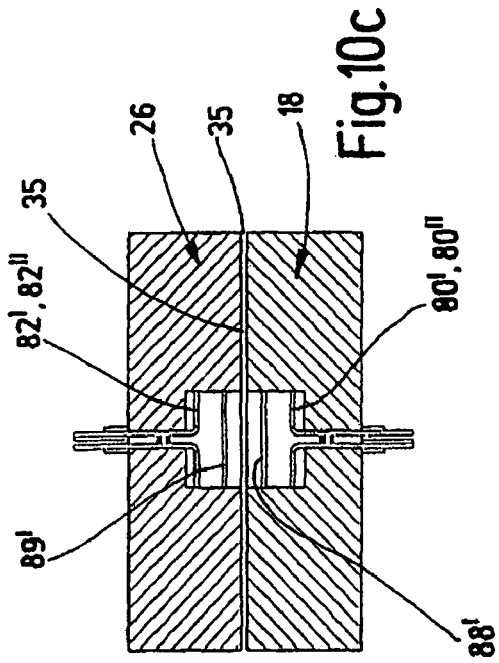

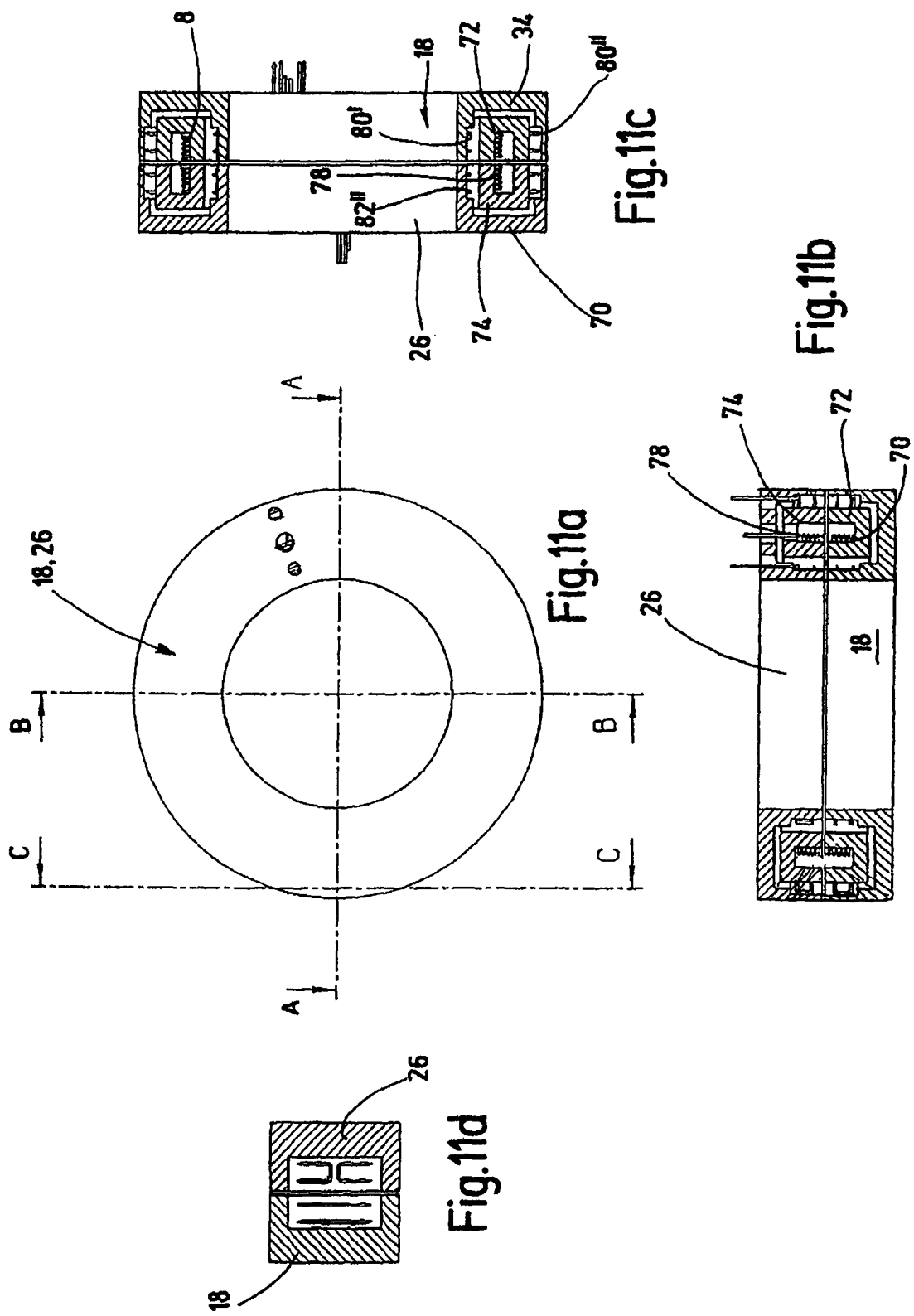

ROTATIONAL TRANSMITTER

The invention relates to a rotary transmitter having a stator part and a rotor part, each having a respective stator core part and a rotor core part, which are separated from one another at mutually facing ends via an air gap, and each having at least one respective power winding, which is wound on the stator core part and the rotor core part, in order to transmit power using the transformer principle, and having respective stator and rotor coupling turns, which are associated with one another in pairs, for inductive data transmission, which are connected to transmitting and/or receiving electronics.

Rotary transmitters of this type are used, for example in adjusting tools with an external power supply (EP 719 199 B1).

In known rotary transmitters of this type, flat coupling turns are provided which can be connected alternately to the transmitting and receiving electronics and, in order to transmit alternating signals without any contact being made, are arranged in the immediate vicinity of the primary winding and of the secondary winding of the transformer, for example in a winding window or in the area of the limb ends of the core parts. The introduction of interference signals from the power winding is unavoidable when the coupling turns are arranged in this way unless additional precautions are taken, such as the use of compensation loops in the coupling turns. A further disadvantage of known rotary transmitters is that the coupling turns are directly subject to the coolant and swarf flow, and therefore to high wear, when used in machine tools, necessitating frequent time-consuming maintenance, with a high material consumption.

Against this background, the object of the invention is to develop a rotary transmitter which allows data transmission without interference and at the same time requires relatively little maintenance effort.

The features specified in claims 1 and 26 are proposed in order to achieve this object. Advantageous refinements and developments of the invention will become evident from the dependent claims.

A first embodiment variant of the invention provides that the coupling turns are separated from the area of the power winding, and are shielded from them, by parts of the respective core part, and are arranged in the associated stator part and rotor part in each case forming a three-dimensional curved loop.

According to one preferred refinement of the invention, the stator coupling turn has a turn branch close to the rotor and a turn branch remote from the rotor, which are connected to one another via at least one direction-changing loop, while the rotary coupling turn expediently has a turn branch close to the stator and at least one turn branch remote from the stator, which are connected to one another via at least one direction-changing loop. The arrangement is in this case chosen such that the turn branches of the stator coupling turn, together with the associated direction-changing loop cover a partially cylindrical area, while the turn branches of the rotor coupling turn together with the associated direction-changing loop cover a cylindrical area. The partially cylindrical area of the stator coupling turn and the cylindrical area of the associated rotor coupling turn are arranged with approximately the same cylinder radii, at an axial distance from one another coaxially with respect to the rotation axis of the rotor part, while the direction-changing loops are arranged essentially parallel to the axis of the cylindrical or partially cylindrical areas. Accordingly, the turn branch of the rotor coupling turn which is close to the stator, and the turn branch of the stator coupling turn which is close to the rotor are arranged with approximately the same circumferential curvature parallel to one another and at an axial distance from one another.

In order to allow an automatic handling system to have access to the rotor, it is advantageous for the stator part with its core part, the power winding and the at least one coupling turn to extend over a cylindrical segment, while the rotor part with its core part, the power winding and the at least one coupling turn can extend over a full cylinder.

However, it is in principle also possible for the turn branches of the stator and rotor coupling turns together with the associated direction-changing loops to cover partially-cylindrical areas arranged with mirror-image symmetry with respect to one another. Accordingly, the stator part and the rotor part together with their core part, the power winding and the at least one coupling turn then extend only over a cylindrical segment. Applications such as these are of particular interest for systems which can pivot with respect to one another and move back to their original position after each pivoting process, while they remain temporarily. On the other hand, it is in principle possible that the turn branches of the stator and rotor coupling turns together with the associated direction-changing loops to cover completely cylindrical areas with mirror-image symmetry with respect to one another. In this case, both the stator part and the rotor part with their core parts, power windings and coupling turns accordingly extend over a complete cylinder. This refinement is used primarily where the rotor does not need to be replaced frequently.

According to a further preferred refinement of the invention, the core part of the rotor part has two core limbs which revolve cylindrically at a radial distance from one another and are connected to one another at one end by a radial yoke forming a U-shaped cross section which is open on the stator side, the rotor power winding revolves in the cylindrical area between the core limbs, and the at least one rotor coupling turn revolves radially outside the inner and/or outer core limb. On the other hand, the core parts of the segment-like stator part expediently has two core limbs which run in a partially cylindrical form at a radial distance from one another and are connected to one another at one end by a radial yoke forming a U-shaped cross section which is open on the rotor side, while the rotor power winding is arranged in the partially cylindrical area between the core limbs, and the at least one stator coupling turn is arranged radially outside the inner and/or outer core limb. The stator and the rotor connecting contacts of the power windings and/or of the coupling turns are each routed outwards on the yoke side. The ferromagnetic core parts are expediently composed of a ferritic material.

One particularly advantageous design refinement of the invention provides for the coupling turns to be in the form of conductor tracks printed on a flat material substrate, in which case the flat material substrate rests against an outer surface, which faces away from the power winding and is aligned parallel to the axis, of one of the core limbs, or is adhesively bonded to it.

In order to provide a defined reference point for radio-frequency analog signal processing, it is advantageous for the flat material substrate to additionally have a conductor area which is at ground potential and is surrounded by the coupling turn, and is connected to the associated transmitting and receiving electronics.

In order to protect the coupling turns and the power windings, at least the turn branches of the stator coupling turns which are close to the rotor and/or the power winding are provided with a dielectric covering layer. The covering layer can in this case be colored with an identification color in order to allow wear to be identified from the outside by a color change. The covering layer expediently has a wall thickness of less than 1 mm, preferably of less than 0.5 mm. If an apparatus is additionally provided for measuring the electrical conductivity of the covering layer, this arrangement can be used to automatically monitor the state of wear. The coupling turns and/or the power windings are advantageously embedded in a potting compound, which at the same time forms the covering layer. The potting compound and/or the covering layer expediently contain/contains a wear-resistant material which, for example, may have ceramic particles added to it.

According to a further advantageous or alternative refinement of the invention, the stator part is arranged in a housing which is composed of a basic housing for holding transmitting and/or receiving electronics with a connecting cable as well as an interchangeable housing, which is arranged detachably on the basic housing, for holding the power winding and the at least one coupling turn, in which case contact elements of a disconnection point for producing the electrical connections are arranged in the basic housing and in the interchangeable housing.

According to one preferred refinement of the invention, the stator part is arranged in a housing which is open toward the rotor in the area of the power winding and of the coupling turns, forming a housing window. The housing window can expediently be closed by a cover, which can be fixed to the housing via a handling system.

While, in the former case, the interchangeable housing can be removed completely with a few actions when not in use, the stator housing in the latter case also remains in its position when not in use and is just protected against wear by the replaceable cover.

The invention will be explained in more detail in the following text with reference to the exemplary embodiments which are illustrated schematically in the drawing, in which:

FIG. 1 shows a side view of a tool head, clamped in a machine spindle, with an inductive rotary transmitter for power and data transmission, in the form of a partially sectioned illustration;

FIGS. 2a and 2b respectively show a side view and a plan view of a stator part, mounted on a spindle box of a machine tool, for the rotary transmitter as shown in FIG. 1, with an interchangeable housing;

FIGS. 3a to 3d show a plan view and three different section illustrations of the stator shown in FIGS. 2a and 2b;

FIGS. 4a and 4b show an illustration corresponding to FIGS. 2a and 2b with a cover panel fitted on the stator opening;

FIGS. 4c and 4d show illustrations corresponding to FIGS. 4a and 4b, with a cover holding supporting the rotating panel;

FIG. 5a shows a plan view of the rotary transmitter, seen from the stator side;

Figure 6A:
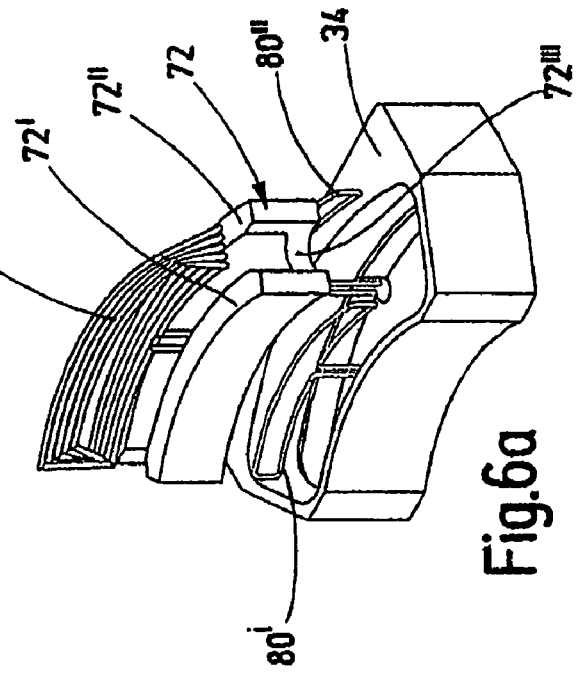
Figure 6D:
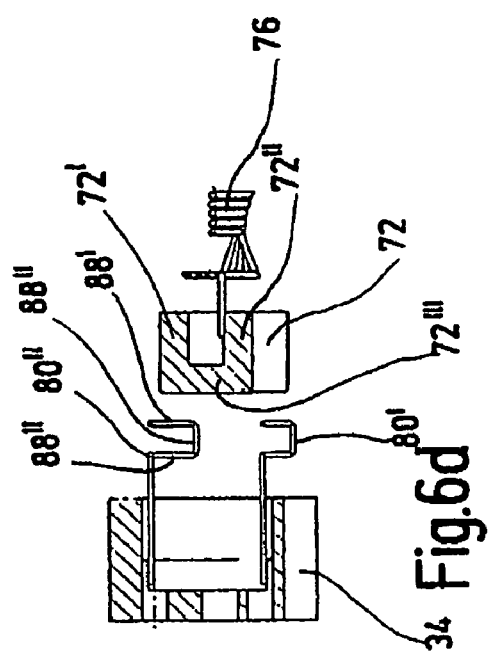
Figure 6B:
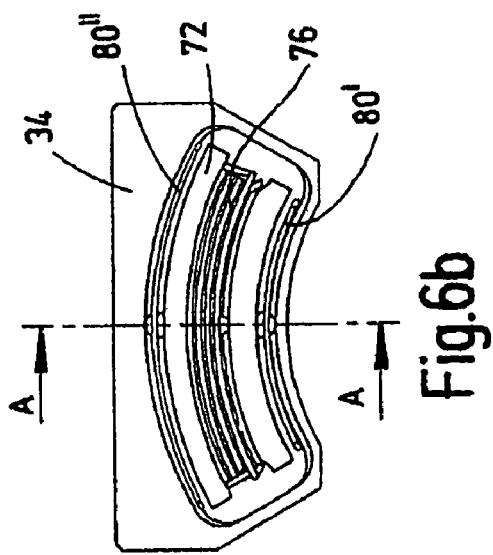
Figure 6C:
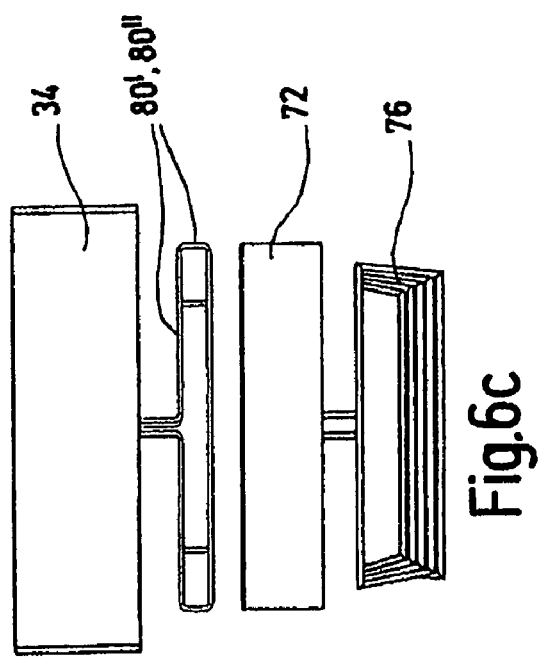

FIGS. 5b and 5c respectively show a section along the section line A-A in FIG. 5a, and an enlarged detail from FIG. 5b;

FIG. 6a shows an illustrative exploded illustration of the stator part of the rotary transmitter;

FIGS. 6b to 6d show two side views and a section illustration of the stator part shown in FIG. 6a;

FIG. 7a shows an illustrative exploded illustration of the rotor part of the rotary transmitter;

FIGS. 7b and 7c respectively show a plan view of the closed side of the rotor part, and a section along the section line A-A in FIG. 7b;

FIGS. 7d and 7e respectively show a plan view of the open side of the rotor part and a section along the section line B-B in FIG. 7d;

FIG. 8a shows an illustrative view of the stator and rotor coupling loop of the rotary transmitter;

FIG. 9a shows an illustration of the rotary transmitter, corresponding to that in FIG. 5a, with two segment-like stator parts for power transmission and for data transmission;

FIGS. 9b and 9c respectively show a section along the section line A-A in FIG. 9a, and an enlarged detail from FIG. 9b;

FIG. 10a shows a modified exemplary embodiment of a rotary transmitter with a segment-like stator and a segment-like rotor;

FIGS. 10b to 10d show a plan view and two section illustrations of the rotary transmitter shown in FIG. 10a;

FIGS. 11a to 11d show a plan view and three section illustrations of a modified exemplary embodiment of a rotary transmitter with a fully cylindrical stator part and rotor part.

Figure 1:
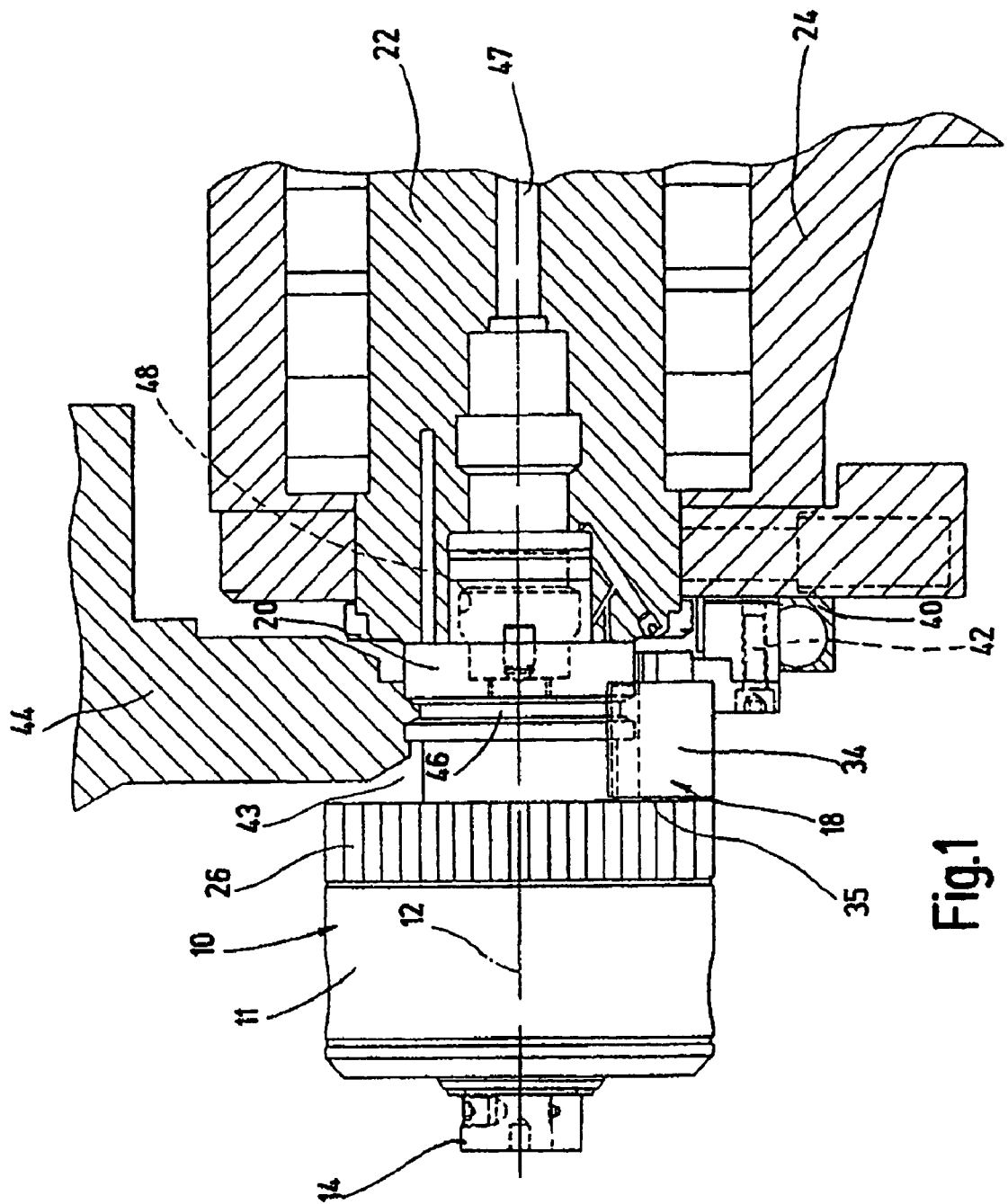

The tool head 10 that is illustrated in FIG. 1 and is in the form of a fine rotating head essentially comprises a base body 11, a slider 14 which can be moved with respect to the base body 11, transversely with respect to the rotation axis 12 of the tool head 10, and is fitted with a tool holder for a cutting tool, at least one electrical load, which is arranged within the tool head 10 and is in the form of a measurement device for direct movement-distance measurement, as well as an electrical adjusting motor for the slide 14. The power supply for the electrical loads and data interchange is provided via a rotary transmitter, which comprises a stator part 18 and a rotor part 26. The tool head 10 can be coupled by means of a tool shaft 20, which projects axially beyond the base body 11, to the machine spindle 22 and to the machine tool 24. The stator housing 34 is arranged on a holder 40, which is fixed to the stator, by means of an adjusting mechanism 42, such that both its distance from the rotor and its rotation position about an axis parallel to the rotation axis 12 can be adjusted, in order to adjust an air gap 35 between the stator part and the rotor part.

In the exemplary embodiment illustrated in FIG. 1, the stator part 18 extends like a segment over only part of the circumference, comprising approximately 70°, of the tool shaft 20 and leaves the majority of the shaft circumference free, forming a free space 43 to allow a tool gripper 44 to have access for automatic tool changing. For tool changing, the tool head 10 is gripped on the gripper groove 46 by the tool gripper 44 from the side opposite the stator part and, when the tool coupling is released, is moved axially with respect to the machine spindle 22. The tool head 10 is coupled to the machine spindle 22 via a clamping mechanism which can be operated via a tie rod 47 from the machine side, engages from the machine side in the cavity 48 in the tool shaft 20, and couples the tool head to the machine spindle 22, providing plane-area clamping and radial clamping.

In the exemplary embodiment shown in FIGS. 2a to 4d, the stator part 18 has a two-part housing 34, comprising a basic housing, 34' and an interchangeable housing 34". The basic housing 34' is fixed to the holder 40, which is fixed to the stator, while the interchangeable housing 34" is detachably attached to the basic housing 34' at the disconnection point 28 by means of two clamping screws 30 and a connecting bolt 31. The signal processing electronics, the transmitting and receiving electronics and the electrical elements for the power supply are arranged on a board 50 in the basic housing 34', and the board 50 is connected to the machine control system by a cable which passes through an opening 52 in the basic housing 34'. The interchangeable housing 34" contains a power winding 76 for power transmission, as well as two coupling turns 80', 80" for inductive data transmission to the rotor part 26. The power winding and the coupling turns are embedded in a potting compound composed of synthetic resin with a wear-resistant additive, such as ceramic particles, and is located behind a housing window 60 in the interchangeable housing 34". The power winding 76 and the coupling turns 80', 80" are detachably connected to the signal processing electronics on the board 50 via an electrical disconnection point 62, which is in the form of a plug connection.

The power winding 76 and the coupling turns 80', 80" are subject to a material flow comprising swarf and/or coolant through the housing window 60, and are therefore subject to wear. This applies in particular when using conventional tool types which do not have a rotor part 26 that clasps the stator part 18. In order to protect the stator windings against unnecessary wear, the interchangeable housing 34" can be removed by a few actions by releasing the two screws 30, without having to remove the basic housing 34'.

A further possibility for wear protection is for the housing window 60 to be closed by a cover 64 when not in use. The cover 64 can be fitted and removed with the aid of a tool changer 66, which is fitted with a cover holder 68 (FIGS. 4c and 4d). It is therefore possible to automate the process of fitting and removing the cover 64.

The stator part 18 and the rotor part 26 each have a respective core part 72, 74 with a U-shaped cross section, and each have a respective power winding 76, 78, wound on the stator core part and the rotor core part, for power transmission using the transformer principle. Furthermore, two stator and rotor coupling turns 80', 80", 82', 82", which are associated with one another in pairs, are in each case provided, and are connected to the transmitting and/or receiving electronics in the relevant components. When installed, the free limbs 72', 72", 74', 74" of the core parts 72, 74 directly face one another, and are separated from one another by the air gap 35. The power windings 76, 78 engage in the winding area 84, 86 between the two core limbs and the yoke 72''', 74''', and are separated from one another in the area of the winding window 84', 86' by the air gap 35. One special feature of the invention is that the coupling turns 80', 80" in the stator part 18 and the coupling turns 82', 82" in the rotor part 26 are each located on the outside of one of the two core limbs. The stator coupling turns 80', 80" in this case have a turn branch 88' close to the rotor and a turn branch 88" remote from the rotor, which are connected to one another via direction-changing loops 88'''. The turn branches 88" remote from the rotor of the stator coupling turns 80', 80" are passed to the exterior through openings 90', 90" through the stator housing 34. The power winding 76 is passed to the exterior via a further opening 90''' through the stator housing 34.

The rotor power winding 78 is located in the winding area 86 of the rotor core part 74, directly opposite the stator power winding 76. The turn branch 89' close to the stator of the rotor coupling turns 82', 82" is located directly opposite the turn branch 88', which is close to the rotor, of the corresponding stator coupling turns 80', 80". The coupling turns cover a partially cylindrical area on the stator side, and a completely cylindrical area, in each case, on the rotor side. They are expediently printed on a flexible flat material substrate in the form of conductor tracks. The flat material substrates expediently have a conductor area which is at ground potential and is surrounded by the coupling turns 80', 80", 82', 82". The coupling turns which are arranged on the outsides of the core limbs 72', 72", 74', 74" are shielded from the field of the power windings 76, 78 by the core limbs, thus largely eliminating the risk of induced interference signals. Furthermore, the coupling turns are protected against the influence of abrasive particle flows in their gap area between the core limbs 72', 72", 74', 74" and the associated housing 34, 70. A further improvement relating to this is achieved by embedding the coupling turns and the power winding in a suitable potting compound.

The configuration of the data transmission paths within the rotary transmitter can be seen particularly well in FIG. 8, which shows that the coupling turns 80', 80", 82', 82" are located opposite the mutually facing turn branches 88', 89' in pairs, and that the stator coupling turns 80', 80" cover a partially symmetrical area, while the rotor coupling turns 82', 82" cover a completely cylindrical area.

In the exemplary embodiment illustrated in FIGS. 9a to 9c, two segment-like stator parts 18', 18" are provided, which are diametrically opposite one another and one (18') of which is intended to hold the power winding 86, while the other (18") is intended to hold the coupling turns 80', 80" for data transmission. In this case, the rotor part 26 is completely cylindrical and contains not only a power winding 78 but also two coupling windings 82', 82" as in the case of the exemplary embodiments described above.

In the case of the exemplary embodiment illustrated in FIGS. 10a to 10d, both the stator part 18 with the stator housing 34 and the rotor part 26 with its housing 70 are in the form of segments. In the operating state, the stator part 18 and the rotor part 26 are arranged with mirror-image symmetry with respect to one another, and are separated from one another at their disconnecting surface by an air gap 35. The two housings 34, 70 each contain a respective core part 72, 74 with a U-shaped cross section, with power windings 76, 78 arranged in the winding areas 84, 86 and with coupling turns 80', 80" and 82', 82", respectively, arranged outside the core limbs. The coupling turns each cover a partially cylindrical area.

In the exemplary embodiment shown in FIGS. 11a to 11d, both the stator part 18 and the rotor part 26 are completely cylindrical. In a corresponding manner, the core parts 72, 74 which are arranged in the stator housing 34 and in the rotor housing 70, as well as the power windings 76, 78 and coupling turns 80', 80", 82', 82" located in them are each circumferentially completely cylindrical. An arrangement of this type is used in particular for rotary transmitters with mutually opposite rotating parts, which do not need to be replaced.

For the purposes of the invention, it is regarded as being equivalent if, rather than the stator and rotor parts with the associated core parts, power windings and coupling arrangements being completely cylindrical or partially cylindrical, equivalents of a partially conical or completely conical type are used.

In summary, the following statement can be made: The invention relates to a rotary transmission, for example for use in machine tools with adjusting tools. The rotary transmitter has a stator part 18 and a rotor part 26, each having a respective stator core part 72 and a rotor core part 74, which are separated from one another at mutually facing ends via an air gap, and each having at least one respective power winding 76, 78, which is wound on the stator core part and the rotor core part, in order to transmit power using the transformer principle, and having respective stator and rotor coupling turns 80', 80", 82', 82", which are associated with one another in pairs, for inductive data transmission. The aim of the invention is to transmit data largely free of interference. A further aim is reduced maintenance effort. In order to achieve this, the invention primarily proposes that the coupling turns 80', 80", 82', 82" are separated from the area of the power winding 76, 78, and are shielded from them, by parts of the respective core parts 72, 74, and are arranged in the associated stator part and rotor part 18, 26 in each case forming a three-dimensioned curved loop.

The invention claimed is:

1. Rotary transmitter having a stator part (18) and a rotor part (26), each having a respective stator core part (72) and a rotor core part (74), which are separated from one another at mutually facing ends, and each having at least one respective power winding (76, 78), which is wound on the stator core part and the rotor core part, in order to transmit power using the transformer principle, and having respective stator and rotor coupling turns (80', 80", 82', 82"), which are associated with one another in pairs, for inductive data transmission, which are connected to transmitting and/or receiving electronics, in which the coupling turns (80', 80", 82', 82") are separated from the area of the power winding (76, 78), and are shielded from them, characterized in that the coupling turns are arranged in the associated stator part and rotor part, in each case forming a three-dimensionally curved loop, in that the stator coupling turn (80', 80") has a turn branch (88') close to the rotor and a turn branch (88") remote from the rotor, which are connected to one another via at least one direction-changing loop (88'''), in that the rotary coupling turn (82', 82") has a turn branch (89') close to the stator and at least one turn branch remote from the stator, which are connected to one another via at least one direction-changing loop, in that the turn branches (88', 88") of the stator coupling turn (80', 80"), together with the associated direction-changing loop (88''') cover a partially cylindrical area, in that the turn branches of the rotor coupling turn (82', 82") together with the associated direction-changing loop cover a cylindrical area, in that the partially cylindrical area of the stator coupling turn (80', 80") and the cylindrical area of the associated rotor coupling turn (82', 82") are arranged with approximately the same cylinder radii, at an axial distance from one another coaxially with respect to the rotation axis (12) of the rotor part (28) and in that the turn branch (89') of the rotor coupling turn (82', 82") which is close to the stator, and the turn branch (88') of the stator coupling turn (80', 80") which is close to the rotor are arranged with approximately the same circumferential curvature parallel to one another and at an axial distance from one another.

2. Rotary transmitter according to claim 1, characterized in that the direction-changing loops (88''') are arranged essentially parallel to the axis of the cylindrical or partially cylindrical areas.

3. Rotary transmitter according to claim 1, characterized in that the stator part (18) with its core part (72), the power winding (76) and the at least one coupling turn (80', 80") extends over a cylindrical segment.

4. Rotary transmitter according to claim 1, characterized in that the rotor part (26) with its core part (74), the power winding (78) and the at least one coupling turn (82', 82") extends over a full cylinder.

5. Rotary transmitter according to claim 1, characterized in that the core part (74) of the rotor part (26) has two core limbs (74', 74") which revolve cylindrically at a radial distance from one another and are connected to one another at one end by a radial yoke (74''') forming a U-shaped cross section which is open on the stator side, in that the rotor power winding (78) revolves in the cylindrical area (86) between the core limbs (74', 74"), and in that the at least one rotor coupling turn (82', 82") revolves radially outside the inner and/or outer core limb (74', 74").

6. Rotary transmitter according to claim 1, characterized in that the core part (72) of the stator part (18) has two core limbs (72', 72") which run in a partially cylindrical form at a radial distance from one another and are connected to one another at one end by a radial yoke (72''') forming a U-shaped cross section which is open on the rotor side, in that the rotor power winding (76) is arranged in the partially cylindrical area (84) between the core limbs (72', 72"), and in that the at least one stator coupling turn (80', 80") is arranged radially outside the inner and/or outer core limb (72', 72").

7. Rotary transmitter according to claim 1, characterized in that the stator and the rotor connecting contacts of the power windings (76, 78) and/or of the coupling turns (80', 80", 82', 82") are each routed outwards on the yoke side.

8. Rotary transmitter according to claim 1, characterized in that the ferromagnetic core parts (72, 74) are composed of ferritic material.

9. Rotary transmitter according to claim 1, characterized in that at least the turn branches (88') of the stator coupling turns (80', 80") which are close to the rotor, and/or the power windings (76), are fitted with a dielectric covering layer.

10. Rotary transmitter according to claim 9, characterized in that the covering layer is colored with an identification color.

11. Rotary transmitter according to claim 10, characterized in that the covering layer has a wall thickness of less than 1 mm, preferably of less than 0.5 mm.

12. Rotary transmitter according to claim 9, characterized in that the covering layer is composed of an insulator material and in that an apparatus is provided for monitoring the electrical conductivity of the covering layer.

13. Rotary transmitter according to claim 1, characterized in that the at least one coupling turn (80', 80", 82', 82") is in the form of a preferably flexible conductor track printed on a flat material substrate.

14. Rotary transmitter according to claim 1, characterized in that the flat material substrate rests against an outer surface, which faces away from the power winding and is aligned parallel to the axis, of one of the core limbs (72', 72", 74', 74"), or is adhesively bonded to it.

15. Rotary transmitter according to claim 13, characterized in that the flat material substrate additionally has a conductor area which is at ground potential and is surrounded by the coupling turn (80', 80", 82', 82").

16. Rotary transmitter according to claim 9, characterized in that the at least one coupling turn (80', 80", 82', 82") and/or the power winding (76, 78) are/is embedded in a potting compound which at the same time forms the covering layer.

17. Rotary transmitter according to claim 16, characterized in that the potting compound and/or the covering layer contain/contains a wear-resistant material.

18. Rotary transmitter according to claim 17, characterized in that the potting compound is composed of a plastic material mixed with ceramic particles.

19. Rotary transmitter according to claim 1, characterized in that the stator part (18) is arranged in a housing (34) which is composed of a basic housing (34') for holding transmitting and/or receiving electronics with a connecting cable as well as an interchangeable housing (34"), which is arranged detachably on the basic housing (34'), for holding the power winding (76) and the at least one coupling turn (80', 80"), and in that detachable plug contacts (62) are arranged between the basic housing (34') and the interchangeable housing (34") in order to produce electrical connections.

20. Rotary transmitter having a stator part (18) and a rotor part (26), each having a respective stator core part (72) and a rotor core part (74), which are separated from one another at mutually facing ends via an air gap, and each having at least one respective power winding (76, 78), which is wound on the stator core part and the rotor core part, in order to transmit power using the transformer principle, and having respective stator and rotor coupling turns (80', 80''', 82', 82"), which are associated with one another in pairs, for inductive data transmission, which are connected to transmitting and/or receiving electronics, characterized in that the stator part (18) is arranged in a housing (34) which is composed of a basic housing (34') as well as an interchangeable housing (34"), which is arranged detachably on the basic housing (34'), for holding the power winding (76) and the at least one coupling turn (80', 80"), and in that detachable plug contacts (62) are arranged between the basic housing (34') and the interchangeable housing (34") in order to produce electrical connections.

21. Rotary transmitter according to claim 20, characterized in that the stator part (18) is arranged in a housing (34) which is open toward the rotor in the area of the power winding (76) and of the coupling turns (80', 80") forming a housing window (60), and in that the housing window (60) can be closed to form a seal by a cover (64) which can preferably be placed on and fixed to the housing (34) via a handling system (66).

22. Rotary transmitter according to claim 1, characterized in that the turn branches of the stator and rotor coupling turns (80', 80", 82', 82"), together with the associated direction-changing loops, cover partially cylindrical areas which are arranged with mirror-image symmetry with respect to one another.

23. Rotary transmitter according to claim 1, characterized in that the turn branches of the stator and rotor coupling turns (80', 80", 82', 82") together with the associated direction-changing loops, cover completely cylindrical areas which are arranged with mirror-image symmetry with respect to one another.

24. Machine tool having a machine frame (24), a machine spindle (22) which can be driven by a motor or motors, and a tool head (10) which is arranged detachably on the machine spindle, with the machine frame (24) being fitted in the vicinity of the spindle with the stator part (18) and with the tool head (10) being fitted with the rotor part (26) of the rotary transmitter according to claim 1, characterized in that the rotor-side surface of the stator part (18) has a swarf-repelling fluid flow applied to it.

25. Machine tool having a machine frame (24), a machine spindle (22) which can be driven by a motor or motors, and a tool head (10) which is arranged detachably on the machine spindle, with the machine frame (24) being fitted in the vicinity of the spindle with the stator part (18) and with the tool head (10) being fitted with the rotor part (26) of the rotary transmitter according to claim 1, characterized by a handling apparatus (66) for mounting or removing at least a part of the stator part (16) on/from the machine frame (24).

26. Machine tool according to claim 25, having a tool magazine, characterized in that the tool magazine has at least one space for holding the part of the stator part which has been removed from the machine frame.

* * * * *